United States Patent [19]
Cerrato

[11] Patent Number: 5,513,436
[45] Date of Patent: May 7, 1996

[54] PENCIL SHARPENER FOR A TAPE MEASURE

[76] Inventor: Jaime M. Cerrato, 67 Reynolds Ave., Parsippany, N.J. 07054

[21] Appl. No.: 398,173

[22] Filed: Mar. 2, 1995

[51] Int. Cl.⁶ ..................................................... B43L 23/00
[52] U.S. Cl. ................................... 30/459; 7/160; 7/163
[58] Field of Search ........................... 30/451, 454, 455, 30/458, 459, 296.1; 7/160, 163; 33/760, 768, 770; D19/73

[56] References Cited

U.S. PATENT DOCUMENTS

D. 221,907 9/1971 Kajiwara .................................. D19/73

FOREIGN PATENT DOCUMENTS 1051165 2/1959 Germany .................................. 30/454

Primary Examiner—Douglas D. Watts
Attorney, Agent, or Firm—Alfred C. Hill

[57] ABSTRACT

A pencil sharpener accessory for a tape measure comprising a body member having a bottom surface with a first predetermined configuration, a top surface with a second predetermined configuration, a cavity disposed in the body member and a recess in the top surface interconnecting the cavity with a periphery of the body member; a pencil sharpener disposed in the cavity communicating with the recess to enable sharpening a pencil; and an arrangement associated with the bottom surface and a predetermined surface of the tape measure to fasten the body member and, hence, the pencil sharpener, to the predetermined surface of the tape measure.

13 Claims, 1 Drawing Sheet

PENCIL SHARPENER FOR A TAPE MEASURE

BACKGROUND OF THE INVENTION

The present invention relates to a flexible, retractable tape measure and more particularly to a pencil sharpener which may be an accessory to the tape measure, or provided integral with the tape measure at the time of manufacture and sale of the tape measure.

It is well known in the construction, carpentry and woodworking professions that when measuring pieces of material a pencil is used to mark the desired measurement as identified by the tape measure. Due to the roughness of the material being measured, the lead in a pencil is worn down and must be frequently sharpened to obtain an accurate mark for the measurement of the material.

It has been the practice in the past to use either a pocket knife, or a utility knife to sharpen the pencil which is very time consuming and could be dangerous due to the sharpness of these knives.

The following utility and design U.S. patents relating to the subject matter of the present application has been uncovered in a search. Utility Patents U.S. Pat. Nos. 503, 794; 4,744,150 and 5,040,256 and U.S. Pat. Nos. Des. 324 184; 339,536 and 341,545.

SUMMARY OF THE INVENTION

An object of the present invention is to provide an improved pencil sharpener for a tape measure.

Another object of the present invention is to provide a pencil sharpener accessory that can be applied to a tape measure already on hand.

Still another object of the present invention is to provide a pencil sharpener for a tape measure that is provided integral with the tape measure at the point of manufacturing and/or sale of the tape measure.

A feature of the present invention is the provision of a pencil sharpener accessory for a tape measure comprising a body member having a bottom surface with a first predetermined configuration, a top surface with a second predetermined configuration, and a cavity disposed in the body member and a recess in the top surface interconnecting the cavity with a periphery of the body member: a pencil sharpener disposed in the cavity communicating with the recess to enable sharpening a pencil; and means associated with the bottom surface and a predetermined surface of the tape measure to fasten the body member and, hence, the pencil sharpener, to the predetermined surface of the tape measure.

Another feature of the present invention is the provision of a pencil sharpener for a flexible, automatically retractable tape measure comprising a housing for the tape measure having a pair of parallel, spaced walls and a wall disposed between and interconnecting the pair of walls; a body member having a bottom surface with a first predetermined configuration integral with a selected one of the pair of walls, a top surface with a second predetermined configuration, a cavity disposed in the body member and a recess in the top surface interconnecting the cavity with a periphery of the body member; and a pencil sharpener disposed in the cavity communicating with the recess to enable sharpening a pencil.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 2:
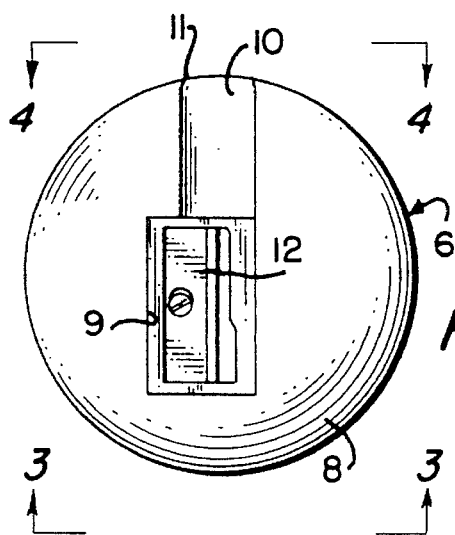
FIG. 2 is a top view of the pencil sharpener accessory of FIG. 1.

Referring to FIGS. 1–5, the pencil sharpener of the present invention can be integral with a tape measure at the time of manufacturing a flexible, automatically retractable tape measure 1, or can be added to tape measure 1 as an accessory after the purchase of tape measure 1. The word "integral" when employed herein and in the claims means belonging to or forming a part of a whole.

Tape measure 1 includes a housing having a pair of parallel, spaced walls 2 and 3 and a wall 4 disposed between and interconnecting the pair of walls 2 and 3. The flexible, automatically retractable tape 5 is coiled up in the housing and is spring loaded to retract into the housing after a measurement is made.

The pencil sharpener, which may be provided on tape measure 1 at the time of manufacture, or as an accessory for tape measure 1 after the tape measure 1 has been bought, includes a body member 6 having a bottom surface 7 with a first predetermined configuration, illustrated in the drawings to be circular, a top surface 8 with a second predetermined configuration substantially as shown, a cavity 9 disposed in the body member 6 and a recess 10 in the top surface interconnecting the cavity 9 with the periphery 11 of the body member 6.

The cavity 9, extending from the top surface 8 to the bottom surface 7, is filled with a pencil sharpener 12 so that it communicates with the recess 10 to enable sharpening a pencil. A means is provided associated with the bottom surface 7 to fasten the body member 6 to a selected one of a pair of walls 2 and 3 on the tape measure 1. As illustrated this means includes a double backed foam tape adhesive, or a double sided adhesive member 13.

When the pencil sharpener of the present invention is provided as an integral part of tape measure 1 at the time of manufacture, the adhesive member 13 can be used, or the body member 6 can be formed integral with the selected one of the side walls 2 and 3.

Figure 1:
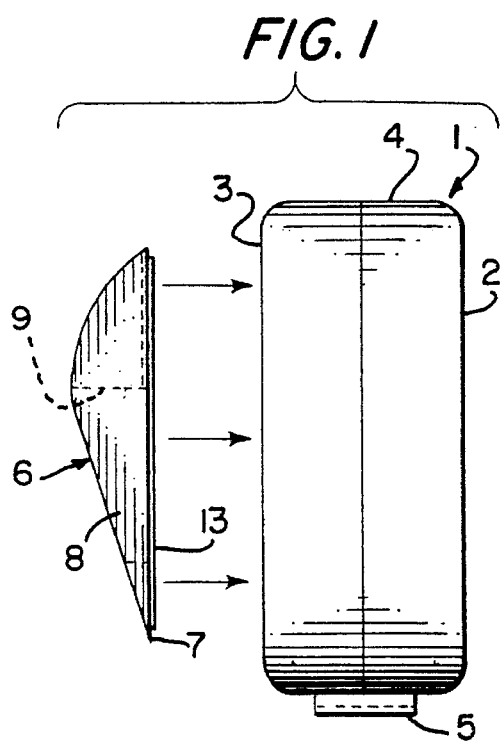
FIG. 1 is an exploded side view of a tape measure and the pencil sharpener to be secured to or made integral with a tape measure in accordance with the principles of the present invention.
Figure 3:
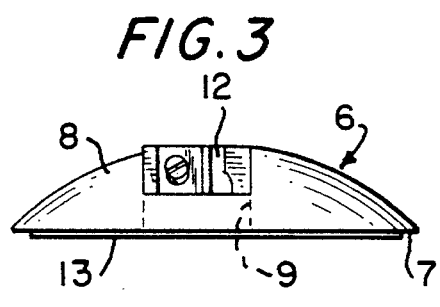
FIG. 3 is a back view of the pencil sharpener of FIGS. 1 and 2.
Figure 4:
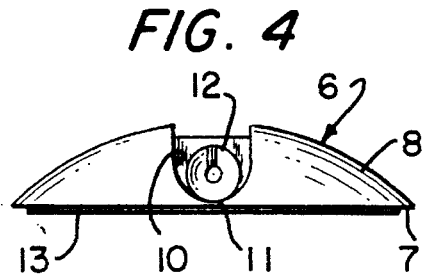
FIG. 4 is a front view of the pencil sharpener of FIGS. 1, 2, and 3.
Figure 5:
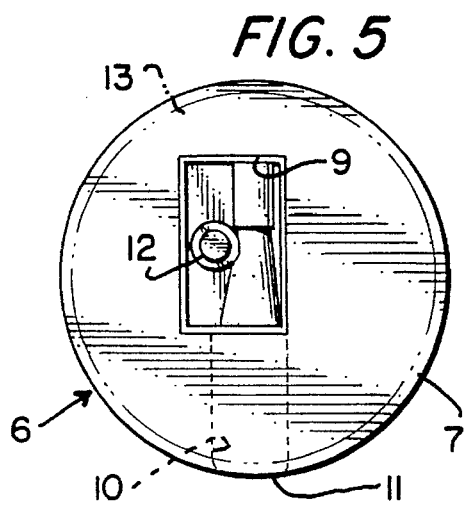
FIG. 5 is a bottom view of the pencil sharpener of FIGS. 1, 2, 3 and 4.

The second predetermined configuration of the top surface 8 is such that is rises a predetermined amount adjacent recess 10 from the periphery 11 and then tapers or slopes down to the periphery of the body members remote from the recess 10 substantially as shown in FIGS. 1, 3 and 4. The second predetermined configuration including a the predetermined amount of rise and the taper or slopes is selected to provide a comfortable feel and zero interference in a hand of the user of the tape measure. Also, this second predetermined configuration allows for easy insertion of the tape measure with the attached pencil sharpener into a typical construction tool belt.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pencil sharpener accessory for a tape measure comprising:

a body member having a bottom surface with a first predetermined configuration, a top surface with a second predetermined configuration, a cavity disposed in said body member and a recess in said top surface interconnecting said cavity with a periphery of said body member;

a pencil sharpener disposed in said cavity communicating with said recess to enable sharpening a pencil; and a double sided adhesive member associated with said bottom surface and a predetermined surface of said tape measure to fasten said body member and, hence, said pencil sharpener, to said predetermined surface of said tape measure.

2. An accessory according to claim 1, wherein
   said first predetermined configuration is circular.

3. An accessory according to claim 2, wherein
   said second predetermined configuration rises a predetermined amount adjacent said recess from said periphery and slopes down to said periphery remote from said recess.

4. An accessory according to claim 3, wherein
   said cavity extends from said bottom surface to said top surface.

5. An accessory according to claim 1, wherein
   said second predetermined configuration rises a predetermined amount adjacent said recess from said periphery and slopes down to said periphery remote from said recess.

6. An accessory according to claim 1, wherein
   said second predetermined configuration is selected to provide a comfortable feel and zero interference in a hand of a user of said tape measure and zero interference when inserting into a tool belt.

7. A combination pencil sharpener and tape measure comprising:

a housing for said tape measure having a pair of parallel, spaced walls and a wall disposed between and interconnecting said pair of walls;

a body member having a bottom surface with a first predetermined configuration integral with a selected one of said pair of walls, a top surface with a second predetermined configuration, a cavity disposed in said body member and a recess in said top surface interconnecting said cavity with a periphery of said body member; and a pencil sharpener disposed in said cavity communicating with said recess to enable sharpening a pencil.

8. A combination according to claim 7, wherein
   said first predetermined configuration is circular.

9. A combination according to claim 8, wherein
   said second predetermined configuration rises a predetermined amount adjacent said recess from said periphery and slopes down to said periphery remote from said recess.

10. A combination according to claim 9, wherein
    said cavity extends from said bottom surface to said top surface.

11. A combination according to claim 10, further including
    a double sided adhesive member to bond said bottom surface to said selected one of said pair of walls to cause said body member to be integral with said tape measure.

12. A combination according to claim 7, further including
    a double sided adhesive member to bond said bottom surface to said selected one of said pair of walls to cause said body member to be integral with said tape measure.

13. A combination according to claim 7, wherein
    said second predetermined configuration rises a predetermined amount adjacent said recess from said periphery and slopes down to said periphery remote from said recess.

* * * * *